(12) United States Patent
Remboski et al.

(10) Patent No.: US 11,355,996 B2
(45) Date of Patent: Jun. 7, 2022

(54) LUBRICANT SUPPORTED ELECTRIC MOTOR WITH CONTROLLED AND BALANCED LUBRICANT FLOW

(71) Applicant: Neapco Intellectual Property Holdings, LLC, Farmington Hills, MI (US)

(72) Inventors: Donald Remboski, Ann Arbor, MI (US); Jacqueline Dedo, Wolverine Lake, MI (US); Mark Versteyhe, Oostkamp (BE)

(73) Assignee: NEAPCO INTELLECTUAL PROPERTY HOLDINGS, LLC, Farmington Hills, MI (US)

( * ) Notice: Subject to any disclaimer, the term of this patent is extended or adjusted under 35 U.S.C. 154(b) by 82 days.

(21) Appl. No.: 17/090,081

(22) Filed: Nov. 5, 2020

(65) Prior Publication Data
US 2021/0135538 A1  May 6, 2021

Related U.S. Application Data

(60) Provisional application No. 62/931,283, filed on Nov. 6, 2019.

(51) Int. Cl.
*H02K 5/24* (2006.01)
*F16N 1/00* (2006.01)
(Continued)

(52) U.S. Cl.
CPC ............... *H02K 5/24* (2013.01); *F16N 1/00* (2013.01); *F16N 7/36* (2013.01); *F16N 7/40* (2013.01);
(Continued)

(58) Field of Classification Search
CPC ...... B60K 2001/006; B60K 2007/0061; B60K 7/0007; B60Y 2306/03; B60Y 2306/05;
(Continued)

(56) References Cited

U.S. PATENT DOCUMENTS 2,937,294 A  5/1960  Macks
3,076,524 A  2/1963  Avallone et al.
(Continued)

FOREIGN PATENT DOCUMENTS

JP  S5999199 A  6/1984
WO  9967544 A1  12/1999

*Primary Examiner* — Naishadh N Desai
(74) *Attorney, Agent, or Firm* — Dickinson Wright PLLC

(57) ABSTRACT

A lubricant supported electric motor includes a stator presenting an stator raceway, and a rotor movable relative to the stator and presenting a rotor raceway disposed in spaced relationship with the stator raceway to define a gap therebetween. A lubricant is disposed in the gap for supporting the rotor relative to the stator. The stator defines at least one hydrostatic support chamber disposed in radially recessed relationship relative to the stator raceway and in fluid communication with the gap. The stator also defines a passageway disposed in fluid communication with the at least one hydrostatic support chamber for providing lubricant to the at least one hydrostatic support chamber and the gap. A flow restriction mechanism is disposed in fluid communication with the passageway for controlling and balancing a supply and pressure of the lubricant in the hydrostatic support chamber.

9 Claims, 2 Drawing Sheets

(51) Int. Cl.
*F16N 7/36* (2006.01)
*H02K 7/04* (2006.01)
*H02K 7/00* (2006.01)
*F16N 7/40* (2006.01)
*B60K 7/00* (2006.01)

(52) U.S. Cl.
CPC .............. H02K 7/006 (2013.01); H02K 7/04 (2013.01); *B60K 7/0007* (2013.01); *F16N 2210/18* (2013.01)

(58) Field of Classification Search
CPC .............. F16C 2380/26; F16C 32/0648; F16C 32/0659; F16N 1/00; F16N 2210/18; F16N 7/36; F16N 7/40; G11B 5/735; H02K 1/06; H02K 2201/03; H02K 2213/09; H02K 5/1677; H02K 5/24; H02K 7/006; H02K 7/04; H02K 7/088; H02K 9/19
See application file for complete search history.

(56) References Cited

U.S. PATENT DOCUMENTS

| | | | |
|---|---|---|---|
| 5,662,188 A | * | 9/1997 | Ito .............................. B62D 5/07 184/6.12 |
| 2016/0261173 A1 | * | 9/2016 | Gugel ....................... H02K 9/19 |
| 2017/0043661 A1 | * | 2/2017 | Reinhart ................ B60K 17/28 |
| 2017/0101914 A1 | * | 4/2017 | Farmer ................. H02K 7/1815 |
| 2019/0093757 A1 | * | 3/2019 | Remboski ................ H02K 5/20 |

* cited by examiner

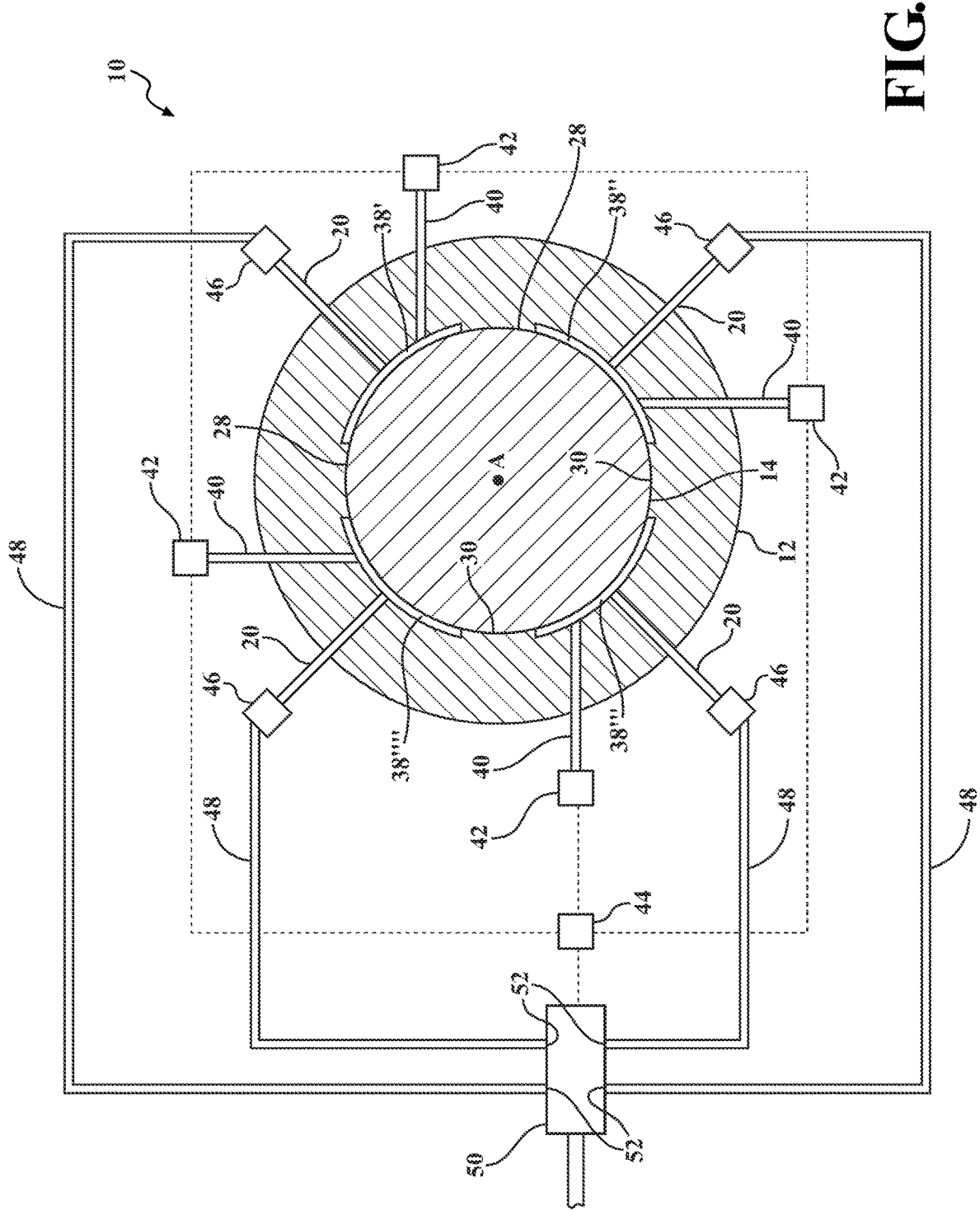

US 11,355,996 B2

LUBRICANT SUPPORTED ELECTRIC MOTOR WITH CONTROLLED AND BALANCED LUBRICANT FLOW

CROSS-REFERENCE TO RELATED APPLICATION

The subject application claims priority to U.S. Provisional Application Ser. No. 62/931,283 filed on Nov. 6, 2019, the entire disclosure of which is incorporated herein by reference.

FIELD OF THE DISCLOSURE

The present disclosure relates generally to a lubricant supported electric motor. More specifically, the present disclosure relates to a lubricant supported electric motor with controlled and balanced lubricant flow and pressure to a plurality of hydrostatic support chambers for improving the stability and performance of the lubricant supported electric motor.

BACKGROUND OF THE INVENTION

This section provides a general summary of background information and the comments and examples provided in this section are not necessarily prior art to the present disclosure.

Various drivelines in automotive, truck, and certain off-highway applications take power from a central prime mover and distribute the power to the wheels using mechanical devices such as transmissions, transaxles, propeller shafts, and live axles. These configurations work well when the prime mover can be bulky or heavy, such as, for example, various internal combustion engines ("ICE"). However, more attention is being directed towards alternative arrangements of prime movers that provide improved environmental performance, eliminate mechanical driveline components, and result in a lighter-weight vehicle with more space for passengers and payload.

"On wheel", "in-wheel" or "near-wheel" motor configurations are one alternative arrangement for the traditional ICE prime mover that distributes the prime mover function to each or some of the plurality of wheels via one or more motors disposed on, within, or proximate to the plurality of wheels. For example, in one instance, a traction motor, using a central shaft though a rotor and rolling element bearings to support the rotor, can be utilized as the "on wheel", "in wheel" or "near wheel" motor configuration. In another instance, a lubricant supported electric motor, such as described in U.S. application Ser. No. 16/144,002, can be utilized as the "on wheel", "in wheel" or "near wheel" motor configuration. While each of these motor configurations result in a smaller size and lighter weight arrangement as compared to the prime movers based on the internal combustion engine, they each have certain drawbacks and disadvantages.

For example, the utilization of traction motors as the "on wheel", "in wheel" or "near wheel" configuration still results in motors that are too heavy and not robust enough to shock loading to be useful for wheel-end applications. In other words, present traction motors are large, heavy structures supported by rolling element bearings, which are too heavy and large to be practical for wheel end applications. Similarly, the utilization of a lubricant supported electric motors as the "on wheel", "in wheel" or "near wheel" motor in an automotive or land vehicle application results in an arrangement with some performance issues when it is subjected to the wide range of dynamic forces encountered during operation at the wide range of speeds encountered in a prime-mover application. Present arrangements of lubricant supported electric motors are not robust enough, and thus not designed to perform well under all the conditions and dynamic forces encountered in a wheel-end motor arrangement. Additionally, present arrangements of lubricant supported electric motors in "on-wheel" applications are static and very conservatively designed systems that have very limited performance measurements, and thus have higher bearing friction/shear loss and shorter life. In other words, current lubricant supported electric motors rely on static design choices, which can limit the operating capability and operating speed range of the motor. Accordingly, a need remains for a lubricant supported electric motor with improved operating characteristics.

SUMMARY OF THE INVENTION

The subject invention is generally directed to a lubricant supported electric motor that includes a stator and a rotor movable relative to the stator. The stator presents an stator raceway and the rotor presents a rotor raceway disposed in spaced relationship with the outer raceway to define a gap therebetween. A lubricant is disposed in the gap for supporting the rotor relative to the stator. The stator defines at least one hydrostatic support chamber disposed in radially recessed relationship relative to the stator raceway and in fluid communication with the gap. The stator defines a passageway disposed in fluid communication with the at least one hydrostatic support chamber for supplying lubricant to the hydrostatic support chamber and the gap. A flow restriction mechanism is disposed in fluid communication with the passageway for controlling and balancing a pressure of the lubricant in the at least one hydrostatic support chamber. The lubricant supported electric motor with controlled and balanced lubricant supply and pressure to the at least one hydrostatic support chamber advantageously maximizes centering and stability of the rotor while minimizing lubricant film shear loss. Accordingly, the subject design is more robust than the prior art systems which rely solely on static design choices. Other advantages will be appreciated in view of the following more detailed description of the subject invention.

BRIEF DESCRIPTION OF THE DRAWINGS

The drawings described herein are for illustrative purposes only of selected embodiments and not all possible implementations, and are not intended to limit the scope of the present disclosure.

FIG. 2 is a cross-sectional end view of the lubricant supporting electric motor illustrating a plurality of hydrostatic support chambers disposed between the rotor and the stator and a plurality of flow control mechanisms each disposed in fluid communication with a respective one of the hydrostatic support chambers.

DETAILED DESCRIPTION OF THE ENABLING EMBODIMENTS

Figure 1:
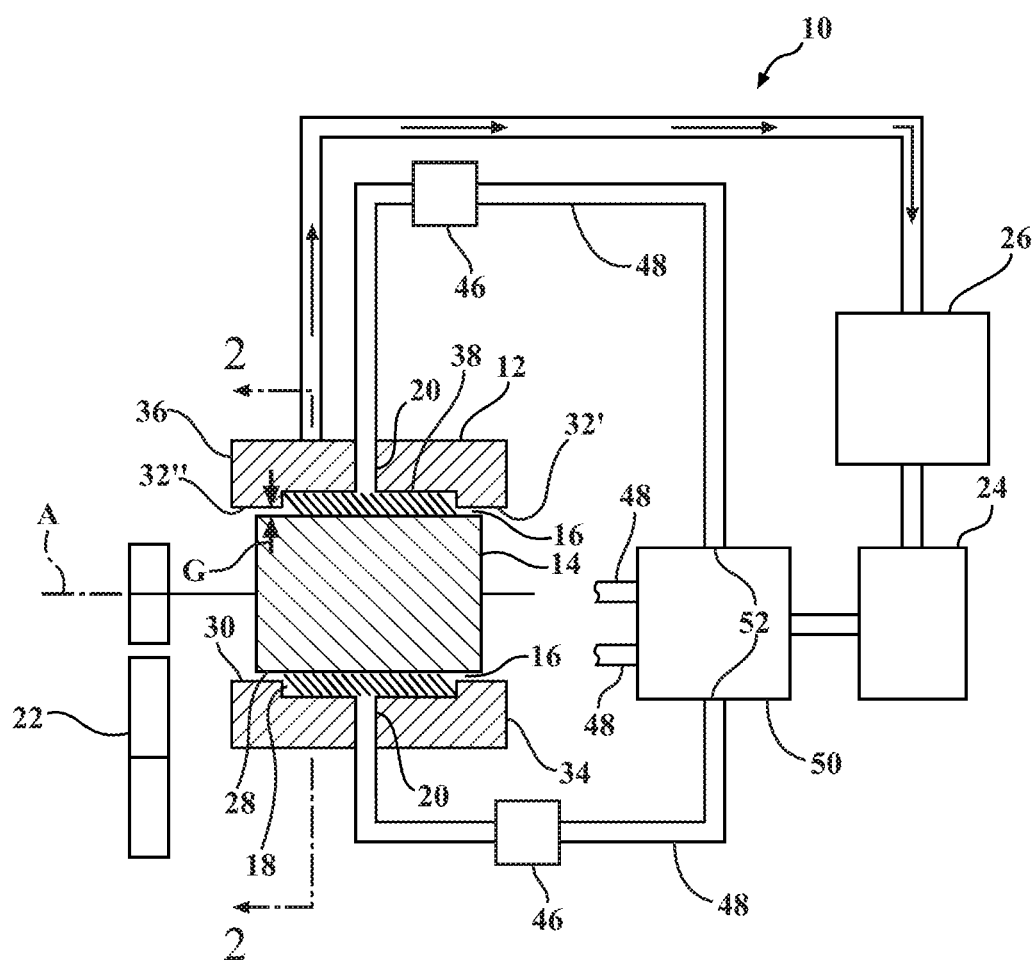
FIG. 1 is a cross-sectional side view of a lubricant supported electric motor illustrating a flow control mechanism disposed in fluid communication with at least one hydrostatic support chamber disposed between a rotor and a stator.

Example embodiments of a lubricant supported electric motor with controlled and balanced lubricant flow and pressure in accordance with the present disclosure will now be more fully described. Each of these example embodiments are provided so that this disclosure is thorough and fully conveys the scope of the inventive concepts, features and advantages to those skilled in the art. To this end, numerous specific details are set forth such as examples of specific components, devices and mechanisms associated with the lubricant supported electric motor to provide a thorough understanding of each of the embodiments associated with the present disclosure. However, as will be apparent to those skilled in the art, not all specific details described herein need to be employed, the example embodiments may be embodied in many different forms, and thus should not be construed or interpreted to limit the scope of the disclosure.

FIGS. 1-2 illustrate a lubricant supported electric motor 10 in accordance with an aspect of the disclosure. As best illustrated in FIG. 1, the lubricant supported electric motor 10 includes a stator 12 and a rotor 14 extending along an axis A and movable relative to the stator 12 to define a gap 16 (also shown as "G" in FIG. 1) therebetween. As shown in FIG. 1, in a preferred arrangement, the rotor 14 is rotatably disposed within the stator 12. In an alternative arrangement, the stator 12 and the rotor 14 can be reversed, with the stator 12 extending along the axis A and the rotor 14 rotatably disposed around the stator 12, without departing from the scope of the subject disclosure. A lubricant 18 is disposed in the gap 16 for supporting the rotor 14 within the stator 12. The lubricant 18 may therefore act as a buffer (e.g., suspension) between the rotor 14 and stator 12 minimizing or preventing contact therebetween. In other words, the lubricant 18 prevents direct contact between the stator 12 and rotor 14 and provides an lubricant supported electric motor 10 which is robust to shock and vibration loading due to the presence of the lubricant 18. Additionally, and alternatively, a substantially incompressible lubricant 18 may be used in order to minimize the gap between the stator 12 and the rotor 14.

As further illustrated in FIGS. 1-2, the stator 12 defines at least one passageway 20 disposed in fluid communication with the gap 16 for introducing the lubricant 18. However, the passageway 20 could be provided on any other components of the lubricant supported electric motor 10 without departing from the subject disclosure. According to an aspect, the lubricant 18 may be cycled or pumped through the passageway 20 and into the gap 16 in various ways. For example, a high pressure source (e.g., a pump) 24 of the lubricant 18 may be fluidly coupled to a low pressure source (e.g., a sump) 26 for the lubricant 18, where the lubricant 18 may move from the lower pressure source to the higher pressure source, through the passageway 20 and into the gap 16. Rotation of the rotor 14 relative to the stator 12 may operate as a self-pump to drive lubricant 18 through the passageway 20 and into the gap 16.

As further illustrated in FIG. 1, the rotor 14 is interconnected to a drive assembly 22 for coupling the lubricant supported electric motor 10 directly to a select wheel of a vehicle. For example, in one instance, the drive assembly 22 may include a planetary gear system. Alternatively, the drive assembly 22 may include one or more parallel axis gears. The stator 12 and rotor 14 are configured to exert an electromagnetic force therebetween to convert electrical energy into mechanical energy, moving the rotor 14 and ultimately driving the wheel coupled to the lubricant supported electric motor 10 via the drive assembly 22. The drive assemblies 22 may provide one or more reduction ratios between the lubricant supported electric motor 10 and the wheel in response to movement of the rotor 14.

As illustrated in FIGS. 1-2, the rotor 14 presents a rotor raceway 28 (arranged as an inner raceway in the Figures) and the stator 12 presents a stator raceway 30 (arranged as an outer raceway in the Figures) disposed in opposing relationship to the rotor raceway 28. However, when the arrangement of the stator 12 and the rotor 14 relative to the axis A are reversed, the respective raceways 28, 30 similarly swap, with the stator raceway 30 arranged as the inner raceway and the rotor raceway 28 arranged as the outer raceway. In either arrangement, the rotor and stator raceways 28, 30 collectively define a plurality of hydrodynamic support surfaces 32 each disposed in axially spaced relationship with one another and circumferentially aligned along the stator raceway 30 in parallel relationship to the axis A as well as the rotor raceway 28. In other words, each of the hydrodynamic support surfaces 32 extend circumferentially along the stator raceway 30 and are disposed in radially spaced relationship with adjacent ones of the plurality of hydrodynamic surfaces 32. As best illustrated in FIG. 1, in a preferred arrangement, the plurality of hydrodynamic surfaces 32 include a first hydrodynamic surface 32' disposed adjacent a first end 34 of the stator 12 and a second hydrodynamic surface 32" disposed adjacent a second end 36 of the stator 12. However, other arrangements of the hydrodynamic surfaces 32 along the stator raceway 30 are contemplated without departing from the scope of the subject disclosure.

As further illustrated in FIGS. 1-2, the stator 12 also defines at least one hydrostatic support chamber 38 (or pocket) extending circumferentially along the stator raceway 30 in radially recessed relationship relative to the hydrodynamic support surfaces 32 and disposed in fluid communication with the gap 16 for additionally receiving the lubricant 18 and lending additional support of the rotor 14 relative to the stator 12 in various modes (e.g., hydrodynamic and hydrostatic) of the lubricant supported electric motor 10. The hydrostatic support chamber 38 is preferably disposed axially between a pair of adjacent ones of the plurality of hydrodynamic support surfaces 32. As best illustrated in FIG. 2, in a preferred embodiment, the at least one hydrostatic support chamber 38 includes a plurality of hydrostatic support chambers 38', 38", 38''', 38'''' spaced circumferentially around the stator 12 and which each have their individualized pressure in the hydrodynamic and hydrostatic modes of the lubricant supported electric motor 10. For example, as illustrated in FIG. 2, in a preferred arrangement the at least one hydrostatic support chamber 38 can include four hydrostatic support chambers 38', 38", 38''', 38'''' each radially recessed from the stator raceway 30, and thus the hydrodynamic support surfaces 32. However, any number of hydrostatic support chambers can be utilized without departing from the scope of the subject disclosure. In a preferred arrangement, each of the plurality of hydrostatic support chambers 38', 38''', 38''', 38'''' are rectangular shaped, however other shapes could be utilized without departing from the scope of the subject disclosure.

As further illustrated in FIGS. 1-2, the at least one passageway 20 defined by the stator 12 includes a plurality of passageways 20 each disposed in fluid communication with a respective one of the hydrostatic support chambers 38 for supplying the lubricant to each hydrostatic support chamber 38', 38''', 38''', 38'''' and then consecutively to the hydrodynamic support surfaces 32. However, as noted previously, the passageways 20 could be provided on any other components of the lubricant supported electric motor 10 without departing from the subject disclosure. As will be explained in more detail below, the supply of lubricant 18 to each hydrostatic support chamber 38 is controlled and balanced to stabilize operation of the rotor 14 within the stator 12. In other words, in the preferred arrangement, the lubricant supported electric motor 10 includes controlled lubricant flow and pressure to the plurality of hydrostatic support chambers 38 to optimally center the rotor 14 in the stator 12 and provide auxiliary support to the rotor 14. The centering of the rotor 14 is particularly important at zero speed and low speed of the lubricant supported electric motor 10. Additionally, auxiliary support from the plurality of hydrostatic support chambers 38 is important at high speed operating conditions where the rotor 14 may become unstable due to ½ order whirl and other phenomenon.

As further illustrated in FIG. 2, the lubricant supported electric motor 10 can include a monitoring port 40 disposed in fluid communication with each hydrostatic support chamber 38. A sensor 42 is coupled to the monitoring port 40 for sensing an operating characteristic of the lubricant 18 disposed within each hydrostatic support chamber 38. For example, the sensor 42 can be a pressure sensor configured to sense a pressure of the lubricant 18 disposed within each hydrostatic support chamber 38. However, the sensor 42 could also be comprised of other sensors 42, such as a temperature sensor for sending a temperature of the lubricant 18 or a viscosity sensor for sensing a viscosity of the lubricant 18, without departing from the scope of the subject disclosure. The utilization of the monitoring port 40 and the sensor 42 advantageously improves the performance of the lubricant supported electric motor 10 by providing the ability to detect operating characteristics of the lubricant 18 disposed within each of the hydrostatic support chambers 38, which is used and analyzed to detect certain operating characteristics of the lubricant supported electric motor 10 such as oil supply faults, stable or instable motor operation, as well as others. In other words, the monitoring port 40 and the sensor 42 facilitates real-time diagnostics and prognostics for the lubricant supported electric motor 10. As best illustrated in FIG. 2, each sensor is electrically connected to a controller 44 for sending the monitored operating characteristic of the lubricant 18 and/or hydrostatic support chamber 38 to the controller 44 for further evaluation to determine the operating characteristic of the lubricant supported electric motor 10 and provide the real-time diagnostics and prognostics.

As best illustrated in FIG. 1, in a preferred arrangement, the controlled supply or flow of lubricant 18 to the plurality of hydrostatic support chambers 38 is implemented using a flow restriction mechanism 46 disposed in fluid communication with each hydrostatic support chamber 38 for limiting a return of lubricant 18 and associated pressure to the lubricant supply pump 24, and thus balancing a pressure differential among the plurality of hydrostatic support chambers 38. This preferably occurs by disposing the flow restriction mechanism 46 along a fluid inlet 48 which is disposed in fluid communication with the passageway 20 for providing lubricant 18 to each respective hydrostatic support chamber 38 For example, if the lubricant supported electric motor 10 includes four hydrostatic support chambers 38', 38'', 38''', 38'''', such as illustrated in FIG. 2, the lubricant supported electric motor 10 would correspondingly include four flow restriction mechanisms 46 each disposed along one of four fluid inlets 48 which are associated with a respective one of the hydrostatic support chambers 38', 38'', 38''', 38'''' to facilitate controlled supply of lubricant 18 to each respective hydrostatic support chamber 38. As further illustrated in FIG. 1, the lubricant supply pump 24 is fluidly coupled to a distribution manifold 50, which is fluidly coupled to each one of plurality of fluid inlets 48, and thus the respective flow restriction mechanisms 46, to supply lubricant to the respective passageways 20, and the respective hydrostatic support chambers 38. As will be understood in view of the following disclosure, low speed centering of the rotor 14 is accomplished in response to a balancing effect provided by the distribution manifold 50, which controls the flow of lubricant 18 to the plurality of hydrostatic support chambers 38', 38'', 38''', 38'''', and then the flow restriction manifolds 46 which prevent return of the lubricant 18 to the distribution manifold 50, and any associated pressure changes, to optimize performance of the lubricant supported electric motor 10.

By way of example, and with reference to the cross-sectional end view of the lubricant supported electric motor 10 illustrated in FIG. 2, if during operation the rotor 14 moves in the direction of the third hydrostatic support chamber 38''', the gap 16 in the hydrodynamic support area surrounding this third hydrostatic support chamber 38''' becomes smaller and therefore presents a greater resistance to lubricant flow. Similarly, as the rotor 14 moves in the direction of the third hydrostatic support chamber 38''', the rotor 14 also moves away from the first hydrostatic support chamber 38' disposed on a diametrically opposite side of the stator 12, which increases the gap 16 in the hydrodynamic support area surrounding this first hydrostatic support chamber 38' and thus decreases resistance to lubricant flow. Due to the action of the flow restriction mechanism 46 in the supply line 48 and passageway 20 that feeds the hydrostatic support chamber 38', the propensity of flow to increase in the hydrostatic support chamber 38' due to the larger gap is reduced. Thus, the pressure in the hydrostatic support chamber 38' is reduced below the pressure in the distribution manifold 50. Similarly, the propensity of the flow in to decrease in the third hydrostatic support chamber 38''', due to the smaller gap, reduces the pressure drop across the flow restriction mechanism 46. This reduction in pressure drop across the flow restriction mechanism 46 allows the pressure in the third hydrostatic support chamber 38''' to increase and approach the pressure in the distribution manifold 50. This difference in pressure between the first and third hydrostatic support chambers 38', 38''' tends to move the rotor 14 away from the first hydrostatic support chamber 38' and towards the third hydrostatic support chamber 38''' to a centered position. This condition of balance is maintained by the action of the flow restriction mechanisms 46 as described above. In other words, the flow restriction mechanisms 46 associated with the first hydrostatic chamber 38' limits the pressure drop in the distribution manifold 50 when the flow area leading away from the first hydrostatic chamber 38', and along the respective fluid inlet 48, increases. Thus, this imbalance in pressure maintained between the first hydrostatic support chamber 38' and the third hydrostatic support chamber 38''', as accomplished by the respective flow restriction mechanisms 46, leads to a net force on the rotor 14 tending to move the rotor 14 to a position balancing the gaps around the first and third hydrostatic support chambers 38', 38''', and therefor centering the rotor 14 in the stator 12. This effect constitutes a dynamic feedback system that tends to keep the rotor 14 centered within the stator 12

To provide adequate rotor centering action, the restriction of the flow restriction mechanism 46 is designed to match the restriction of the hydrodynamic support gap area disposed adjacent and surrounding the respective hydrostatic support chamber 38. For example, the flow restriction mechanism 46 can take many forms, such as linear (laminar flow, capillary), non-linear (turbulent flow, choked flow, orifice), or varying restriction depending on pressure, flow or actuator input. Additionally, dynamic control of the lubricant supported electric motor 10 may include variable flow restriction mechanisms 46 and variable oil supply pressure controls. These variations are preferably controlled by an algorithm with static parameters or with dynamically tunable parameters. Thus, as illustrated in FIG. 2, the controller 44 can also be disposed in electrical communication with the distribution manifold 48 for individualized control of lubricant 18 to the plurality of hydrostatic support chambers 38', 38'', 38''', 38'''' based on the monitored operating characteristics and real-time diagnostics and prognostics evaluated by the controller 44, as discussed in more detail above. For example, the distribution manifold 50 includes a plurality of ports 52 each disposed in fluid communication with a respective one of the fluid inlets 48 leading to the hydrostatic support chambers 38', 38'', 38'-, 38''''. The plurality of ports 52 can be individually and separately controlled, based on the operating characteristics of the lubricant 18 and/or hydrostatic support chambers 38, to individually and separately alter flow from the distribution manifold 50 to the hydrostatic support chambers 38 based on the real-time needs of the lubricant supported electric motor 10. For example, if the controller 44 determines that a pressure of the lubricant 18 in the third hydrostatic support chamber 38''' is too low, the controller 44 can open the port 52 disposed in fluid communication with the respective fluid inlet 48 to increase a flow of lubricant 18 to the third hydrostatic support chamber 38'''. The flow restriction mechanism 46 then prevents increased pressure in the third hydrostatic support chamber 38''' from returning to the distribution manifold 50.

In summary, the incorporation of controlled lubricant supply to hydrostatic support chambers 38 of a lubricant supported electric motor 10 provides adequate bearing stiffness to insure stability of the rotor 14 while at the same time providing the lowest possible shear loss in the lubricant 18. Additionally, control of lubricant supply to the plurality of hydrostatic support chambers 38, and thus their respective pressures, provides rotor centering and rotor stability not achievable with the prior static designs for lubricant supported electric motors. Accordingly, the subject disclosure maximizes rotor centering and rotor stability while minimizing lubricant film shear loss.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A lubricant supported electric motor comprising:
a stator presenting an stator raceway;
a rotor movable relative to said stator about an axis and presenting a rotor raceway disposed in spaced relationship with said stator raceway to define a gap therebetween;
a lubricant disposed in said gap for supporting said rotor relative to said stator;
said stator defining a plurality of hydrostatic support chambers disposed in circumferentially spaced relationship to one another and each radially recessed relative to said stator raceway and in fluid communication with said gap;
said stator defining a a plurality of passageways each disposed in fluid communication with a respective one of said plurality of hydrostatic support chambers for providing lubricant to said respective one of said hydrostatic support chamber and said gap; and
a plurality of flow restriction mechanisms each disposed in fluid communication with a respective one of said passageways for controlling and balancing a supply and pressure of said lubricant in said plurality of hydrostatic support chambers.

2. The lubricant supported electric motor as set forth in claim 1, further comprising a distribution manifold disposed in fluid communication with each of said plurality of passageways for individually controlling a flow of lubricant to said plurality of hydrostatic support chambers.

3. The lubricant supported electric motor as set forth in claim 2, further comprising a plurality of fluid inlets each extending between said distribution manifold and a respective one of said plurality of passageways, and each of said plurality of flow restriction mechanisms disposed along a respective one of said fluid inlets between a respective one of passageways and said distribution manifold for preventing return of the lubricant and the pressure in said plurality of hydrostatic support chambers to said distribution manifold.

4. The lubricant supported electric motor as set forth in claim 3, wherein said distribution manifold includes a plurality of fluid ports each disposed in fluid communication with a respective one of said plurality of fluid inlets and individually and separately controllable to alter flow of the lubricant from said distribution manifold to said plurality of hydrostatic support chambers.

5. The lubricant supported electric motor as set forth in claim 4, further comprising at least one sensor disposed in fluid communication with said plurality of hydrostatic support chambers for sensing an operating condition of said lubricant disposed within each hydrostatic support chamber; and
a controller disposed in electrical communication with said at least one sensor and said distribution manifold for determining an operating characteristic of the lubricant supported electric motor and adjusting said plurality of ports of said distribution manifold based on the determined operating characteristic.

6. The lubricant supported electric motor as set forth in claim 5, wherein said sensor is comprised of a pressure sensor configured to sense a pressure of said lubricant disposed within said plurality of hydrostatic support chambers.

7. The lubricant supported electric motor as set forth in claim 2, further comprising a pump disposed in fluid communication with said distribution manifold for supplying lubricant to said distribution manifold.

8. The lubricant supported electric motor as set forth in claim 1, wherein said rotor extends along said axis and is rotatably disposed within said stator.

9. The lubricant supported electric motor as set forth in claim 1, wherein said rotor is operably connected to a final drive device that is interconnected to a wheel of a vehicle.

* * * * *